United States Patent
Konrad et al.

(10) Patent No.: US 7,378,145 B2
(45) Date of Patent: May 27, 2008

(54) HOT-EMBOSSABLE POLYESTER FILM

(75) Inventors: Matthias Konrad, Hofheim (DE);
Bodo Kuhmann, Runkel (DE);
Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 11/875,066

(22) Filed: Oct. 19, 2007

(65) Prior Publication Data
US 2008/0102234 A1 May 1, 2008

(30) Foreign Application Priority Data
Oct. 28, 2006 (DE) ...................... 10 2006 050 797

(51) Int. Cl.
B32B 27/08 (2006.01)
B32B 27/30 (2006.01)
B32B 27/36 (2006.01)
B32B 37/15 (2006.01)

(52) U.S. Cl. ...................... 428/212; 428/213; 428/215; 428/216; 428/480; 428/483; 428/522; 428/910; 264/288.4; 264/290.2; 264/173.11; 264/173.15; 264/173.16

(58) Field of Classification Search ...................... None
See application file for complete search history.

(56) References Cited

U.S. PATENT DOCUMENTS

| 4,091,150 | A | | 5/1978 | Roelofs |
| 4,456,639 | A | * | 6/1984 | Drower et al. ................. 428/13 |
| 4,557,963 | A | * | 12/1985 | Caines ......................... 428/156 |
| 4,734,335 | A | * | 3/1988 | Monzer ........................ 428/480 |
| 4,837,072 | A | * | 6/1989 | Kraetschmer ................ 428/201 |
| 4,913,858 | A | * | 4/1990 | Miekka et al. .............. 264/1.34 |
| 5,728,347 | A | | 3/1998 | Collette et al. |
| 5,800,911 | A | | 9/1998 | Sankey et al. |
| 6,432,527 | B1 | * | 8/2002 | Perez et al. .................. 428/343 |
| 6,502,943 | B2 | * | 1/2003 | Nakamura et al. ........... 359/603 |
| 6,969,695 | B2 | * | 11/2005 | Kuboyama et al. ......... 503/201 |
| 6,989,349 | B2 | * | 1/2006 | Tatewaki et al. ............ 503/201 |
| 2003/0127847 | A1 | * | 7/2003 | Keller et al. ................. 283/109 |
| 2005/0130840 | A1 | * | 6/2005 | Tatewaki et al. ............ 503/201 |
| 2005/0170961 | A1 | * | 8/2005 | Kuboyama et al. ......... 503/227 |

FOREIGN PATENT DOCUMENTS

| EP | 115 033 | | 8/1984 |
| EP | 0 945 256 A2 | | 9/1999 |
| EP | 1 138 480 A2 | | 10/2001 |
| EP | 1 291 154 A2 | | 3/2003 |
| EP | 1 291 155 A2 | | 3/2003 |
| JP | 2002-156505 | * | 5/2002 |
| JP | 2006-264221 | * | 10/2006 |

* cited by examiner

*Primary Examiner*—Vivian Chen
(74) *Attorney, Agent, or Firm*—ProPat, L.L.C.

(57) ABSTRACT

The present invention relates to a transparent, hot-embossable, biaxially oriented polyester film having a base layer (B), an amorphous outer layer (A) with a coating on this outer layer (A), and a crystalline outer layer (c). The invention further relates to the use of such film and to a process for its production.

15 Claims, No Drawings

HOT-EMBOSSABLE POLYESTER FILM

CROSS-REFERENCE TO RELATED APPLICATIONS

This application claims priority to German Patent Application No. 10 2006 050 797.5 filed Oct. 28, 2006 which is hereby incorporated herein by reference in its entirety.

FIELD OF THE INVENTION

The invention relates to a transparent, hot-embossable, biaxially oriented polyester film, comprising a base layer (B) and, applied to the two sides of this base layer, outer layers (A) and (C), where the outer layer (A) is an amorphous outer layer which in turn has been provided with a coating, and where the outer layer (C) is a crystalline outer layer. The invention further relates to the use of a film and to a process for its production.

BACKGROUND OF THE INVENTION

Holograms are used for decorative packaging, security features, and various other applications. The hologram is produced on structured surfaces which have been embossed into a substrate via heating and pressure. These structures are mostly then metallized. Production of these holograms often uses polyester films with a thick acrylate layer (from 0.5 to 2 µm), where the acrylate layer is applied in an off-line process, i.e. after film production.

U.S. Pat. No. 4,913,858 describes the requirements for hologram production using off-line coating of embossing films. The disadvantage is that a second processing step is needed, and incurs additional costs.

EP-A-1 291 154 and EP-A-1 291 155 describe a coated embossable polyester film in which the coating is applied in-line prior to the transverse stretching process. The coating is comprised of a styrene-acrylate copolymer or of a sulfopolyester. The thickness of the coating is from 0.1 to 0.4 µm. Nothing is said about the recyclability of the film or return into the film-production process.

EP-A-115 033 describes a multilayer polyester film with thermoplastically embossable internal layer. The external layers of the film are comprised of polyethylene terephthalate, and the middle layer is comprised of a copolyester comprised of ethylene terephthalate units and ethylene isophthalate units. The middle layer makes up most of the thickness, and the mechanical strength of this film is therefore markedly lower than that of film comprised of straight polyethylene terephthalate. A further disadvantage of this film is that the thickness of the outer layer is relatively high and is in the region of the embossment depth of holograms. This makes it impossible to achieve good spatial resolution of the embossment.

EP-A-1 138 480 describes a biaxially oriented, sealable polyester film with a base layer and with an amorphous sealable outer layer. The sealable outer layer has a minimum sealing temperature of at most 110° C. and a seal seam strength of at least 1.3 N/15 mm of film width. This type of film cannot be used as hot-embossing film, since the sealable layer adheres to the embossing roles at the process temperatures used, which are above 120° C.

It would be desirable to provide a film which is directly embossable without any off-line step. This would lead to saving of a processing step and therefore a cost saving. However, the layer thicknesses needed for the embossing process then become a problem, and cannot be achieved using the standard coating methods used in polyester film production. Furthermore, these coatings would lead to problems in return of the regrind into the film-production process.

SUMMARY OF ADVANTAGEOUS EMBODIMENTS OF THE INVENTION

It was accordingly an object of the present invention to provide a hot-embossable, biaxially oriented polyester film which does not have the disadvantages of the films of the prior art and which in particular features
little tendency to adhere to itself and to metal,
good embossing performance and
ease of production.

Surprisingly, it has been found that adhesion can be eliminated, even at high temperatures, in a coextruded film with an amorphous outer layer, which is often used as sealable film, if the amorphous layer is covered with a suitable very thin coating. Properties relating to further processing can then, if appropriate, be adjusted by way of the outer layer opposite to the amorphous outer layer.

The invention achieves the object via a transparent, hot-embossable, biaxially oriented polyester film, comprising a base layer (B) and, applied to the two sides of this base layer, outer layers (A) and (C), where the outer layer (A) is an amorphous outer layer which in turn has been provided with a coating, and where the outer layer (C) is a crystalline outer layer, where a) the crystallinity of the amorphous outer layer (A), expressed as the ratio of the signals at 1040 $cm^{-1}$ and 1337 $cm^{-1}$ in the ATR spectrum, is greater than 2.2,
b) the thickness of the coating on the outer layer (A) is from 0.01 to 0.1 µm,
c) the coating has been crosslinked,
d) the film does not adhere to itself or metal at high temperature.

The design of the inventive film is moreover preferably such that e) the thickness of the amorphous outer layer (A) is from 0.5 to 5.0 µm,
f) the amorphous outer layer (A) comprises less than 0.01% by weight of external particles (based on the total weight of the outer layer (A)),
g) the crystallinity of the crystalline outer layer (C), expressed as the ratio of the signals at 1040 $cm^{-1}$ and 1337 $cm^{-1}$ in the ATR spectrum, is smaller than 1.2,
h) the outer layer (C) comprises particles at a concentration of from 0.05 to 0.5% by weight,
i) the gloss (measured at 20°) of the outer layer (A) is greater than 100,
j) the haze of the film is smaller than 8%.

DETAILED DESCRIPTION OF ADVANTAGEOUS EMBODIMENTS OF THE INVENTION

Amorphous Outer Layer (A)

The amorphous outer layer (A), preferably applied via coextrusion to the base layer (B), is preferably in essence comprised of copolyesters which are mainly comprised of isophthalic-acid-derived units and of terephthalic-acid-derived units, and of ethylene-glycol-derived units. The remaining monomer units are derived from the other aliphatic, cycloaliphatic, or aromatic diols and, respectively, dicarboxylic acids as described at a later stage below for the base layer (B). The preferred copolyesters are those comprised of ethylene terephthalate units and of ethylene isophthalate units. The proportion of ethylene terephthalate is preferably from 60 to 95 mol %, and the corresponding proportion of ethylene isophthalate is preferably from 40 to 5 mol %. Particular preference is given to copolyesters in which the proportion of ethylene terephthalate is from 65 to 90 mol % and the corresponding proportion of ethylene isophthalate is from 35 to 10 mol %, and very particular preference is given to copolyesters in which the proportion of ethylene terephthalate is from 70 to 85 mol % and the corresponding proportion of ethylene isophthalate is from 30 to 15 mol %.

The amorphous outer layer (A) preferably comprises less than 0.01% by weight (based on the weight of the outer layer (A)), of external particles, and in particular none at all. This gives the best embossability.

The thickness of the amorphous outer layer (A) is from 0.5 to 5.0 µm, preferably from 0.6 to 4.5 µm, and particularly preferably from 0.7 to 4.0 µm. If the thickness of the outer layer is smaller than 0.5 µm, the possible embossment depth is too small. For economic reasons, the thickness of the outer layer should not exceed 5 µm.

The ratio of the signals at 1040 cm$^{-1}$ and 1337 cm$^{-1}$ in the ATR spectrum of the amorphous outer layer (A) of the film is greater than 2.2. This type of signal ratio is obtained when the proportion of amorphous domains is large. This is especially the case when the outer layer is comprised of the abovementioned copolyesters and preferably the ethylene isophthalate content is greater than or equal to 5 mol %. If the ratio is smaller than 2.2, the proportion of crystalline domains is too high and the layer has unsatisfactory embossability. This is especially the case when the ethylene isophthalate content of the outer layer is less than 5 mol %. The ATR spectrum can be recorded directly on the coated film, as long as the thickness of the coating does not exceed 0.1 µm; it is assumed that a coating thickness of up to 0.1 µm has no effect on the spectrum of the outer layer. In the event that doubts arise in this respect, the coating can be removed prior to recording of the ATR spectrum.

The gloss of the outer layer (A) is greater than 100, preferably greater than 125, and particularly preferably greater than 150. If the gloss is smaller than 100, a hologram embossed into the film lacks brilliance.

Coating

The coating used on the outer layer (A) comprises an acrylate coating. The acrylic copolymers preferably used are in essence comprised of at least 50% by weight of one or more polymerizable acrylic and/or methacrylic monomers and from 1 to 15% by weight of a copolymerizable comonomer which in the copolymerized state is capable of intermolecular crosslinking on exposure to an elevated temperature, if appropriate without addition of any separate resin-like crosslinking agent.

The amount present of the acrylic component of the copolymers is preferably from 50 to 99% by weight, and it is preferably comprised of an ester of methacrylic acid, in particular of an alkyl ester whose alkyl group has up to 10 carbon atoms, examples being the methyl, ethyl, n-propyl, isopropyl, n-butyl, isobutyl, tertiary-butyl, hexyl, 2-ethylhexyl, heptyl, and n-octyl group. Acrylic copolymers derived from a lower alkyl acrylate (C1 to C4), in particular ethyl acrylate, together with a lower alkyl methacrylate, give particularly good adhesion to the polyester film. Very particular preference is given to use of copolymers comprised of an alkyl acrylate, e.g. ethyl acrylate or butyl acrylate, together with an alkyl methacrylate, e.g. methyl methacrylate, the total amount of these in particular being from 70 to 95% by weight. The preferred proportion present of the acrylate comonomer of these acrylic/methacrylic combinations is from 15 to 65 mol %, and the proportion present of the methacrylate comonomer is preferably generally greater by from 5 to 20 mol % than the proportion of the acrylate comonomer. The proportion present of the methacrylate is preferably from 35 to 85 mol % in the combination.

The coating must have been crosslinked, in order to inhibit adhesion of the film to the embossing tool. The coating itself is non-embossable and therefore cannot have a thickness of more than 0.1 µm, in order that the film is embossable.

Suitable comonomers can be used for crosslinking, examples being N-methylolacrylamide, N-methylolmethacrylamide, and the corresponding ethers; epoxy materials, e.g. glycidyl acrylate, glycidyl methacrylate, and allyl glycidyl ether; monomers containing carboxy groups, e.g. crotonic acid, itaconic acid, or acrylic acid, anhydrides, e.g. maleic anhydride or itaconic anhydride; monomers containing hydroxy groups, e.g. allyl alcohol and hydroxyethyl or hydroxypropyl acrylate or the corresponding methacrylate; amides, e.g. acrylamide, methacrylamide, or maleamide, and isocyanates, e.g. vinyl isocyanate or allyl isocyanate. Among the crosslinking comonomers mentioned here, preference is given to N-methylolacrylamide and N-methylolmethacrylamide, and specifically and primarily because copolymer chains which contain one of these monomers are capable of condensation with one another and therefore of the desired intermolecular crosslinking, on exposure to elevated temperatures.

However, the crosslinking of the preferred acrylate coating can also be achieved via the presence of a foreign crosslinking agent, e.g. a melamine-formaldehyde condensate or urea-formaldehyde condensate. The concentration of the crosslinking agent is advantageously from 1 to 20% by weight, preferably from 2 to 15% by weight, particularly preferably from 3 to 10% by weight (based in each case on the total weight of the coating polymer (copolymer plus crosslinking agent)).

For the coating process, the abovementioned acrylic coating composition is emulsified in a protic solvent, preferably water, applied in the form of emulsion to the film. The solvent is then evaporated, for example via exposure to heat during the transverse stretching of the film. The concentration of the coating composition and the coating solution is advantageously from 2 to 15% by weight (based on the weight of the finished coating solution), preferably from 3 to 12% by weight, and particularly preferably from 4 to 10% by weight.

The amount advantageously applied of the acrylic coating composition (emulsion) is from 1 to 10 g/m$^2$ of film surface, preferably from 1.2 to 8 g/m$^2$, and particularly preferably from 1.4 to 6 g/m$^2$.

The thickness of the dried coating is in the range from 0.01 to 0.1 µm. This thickness is sufficient to inhibit adhesion of the amorphous layer to the embossing tool. Thicker coatings lead to a poorer embossing result, since the coating itself is not embossable, but rather serves as protective layer.

Polymers Used for the Base Layer (B) and for the Outer Layer (C)

The base layer (B) and the outer layer (C) of the film are preferably comprised of at least 90% by weight of a thermoplastic polyester. Examples of materials suitable for this are polyesters comprised of ethylene glycol and terephthalic acid (=polyethylene terephthalate, PET), ethylene glycol and naphthalene-2,6-dicarboxylic acid (=polyethylene 2,6-naphthalate, PEN), 1,4-bishydroxymethylcyclohexane and terephthalic acid (=poly-1,4-cyclohexanedimethylene terephthalate, PCDT), or else made from ethylene glycol, naphthalene-2,6-dicarboxylic acid and biphenyl-4,4'-dicarboxylic acid (=polyethylene 2,6-naphthalate bibenzoate, PENBB). Preference is given to polyesters comprised of at least 90 mol %, in particular at least 95 mol %, of ethylene glycol units and terephthalic acid units, or of ethylene glycol units and naphthalene-2,6-dicarboxylic acid units. The remaining monomer units derive from other aliphatic, cycloaliphatic, or aromatic diols and other aliphatic, cycloaliphatic, or aromatic dicarboxylic acids.

Examples of other suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) or branched aliphatic glycols having up to 6 carbon atoms. Among the cycloaliphatic diols, mention should be made of cyclohexanediols (in particular 1,4-cyclohexanediol). Examples of suitable other aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also very suitable.

Preferred other aromatic dicarboxylic acids are benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the ($C_3$-$C_{19}$) alkanediacids are particularly suitable, and the alkane moiety here may be straight-chain or branched.

One way of preparing the polyesters is the known transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well known polycondensation catalysts, such as antimony trioxide or titanium salts. Another equally good preparation method is the direct esterification process in the presence of polycondensation catalysts. This starts directly from the dicarboxylic acids and the diols. Inventive polyesters can be obtained commercially.

The base layer (B) can also comprise conventional additives, for example UV stabilizers, hydrolysis stabilizers, antiblocking agents (e.g. by way of the regrind).

The outer layer (C) can also comprise conventional additives, for example stabilizers. These additives are advantageously added to the polymer or to the polymer mixture before melting begins. Examples of stabilizers advantageously used are phosphorus compounds, such as phosphoric acid or phosphoric esters.

To improve winding performance and processability, the outer layer (C) comprises inert particles, i.e. added particles, as fillers. Typical particles used in the outer layer (C) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc, or manganese salts of the dicarboxylic acids used, carbon black, titanium dioxide, kaolin, or particulate polymers, e.g. crosslinked polystyrene particles or crosslinked acrylate particles.

The concentration of the inert particles in the outer layer (C) is from 0.05 to 0.50% by weight (based on the weight of the outer layer), and in essence depends on the optical properties to be achieved in the film. The size of the particles ($d_{50}$ value) is preferably in the range from 1.0 to 5.0 µm.

The ratio of the signals at $1010\ cm^{-1}$ and $1337\ cm^{-1}$ in the ATR spectrum of the crystalline outer layer (C) of the film is smaller than 1.2. This type of signal ratio is obtained when the proportion of amorphous domains is small. This is achieved when the outer layer is comprised of the abovementioned polymers, preferably in the abovementioned molar proportions. If the ratio is greater than 1.2, the proportion of amorphous domains is too high, and the layer is too soft. This can occur especially when the proportion of comonomers in the polyester used is too great.

The Multilayer Film

The thickness of the outer layers (A) and (C) in the film is generally greater than 0.4 µm and is preferably in the range from 0.5 to 10.0 µm, in particular in the range from 0.8 to 9.0 µm, and particularly preferably in the range from 1.0 to 8.0 µm.

The total thickness of the inventive polyester film can vary within wide limits. It is preferably from 5 to 500 µm, in particular from 7 to 300 µm, preferably from 10 to 100 µm.

According to the invention, the film has three layers and comprises the base layer (B), the amorphous outer layer (A), and the outer layer (C) (A-B-C).

The haze of the film is smaller than 8%, preferably smaller than 6%, and particularly preferably smaller than 4%.

At high temperature the film does not adhere to itself or to metal. Adhesion is therefore smaller than 1.0 N/15 mm, preferably smaller than 0.7 N/15 mm, and particularly preferably smaller than 0.4 N/15 mm, both with respect to itself and with respect to metal.

Production Process

The invention also provides a process for production of the invention polyester film by the coextrusion process known from the literature.

The procedure in the context of this process is that the melts corresponding to the individual layers A, B and C of the film are coextruded through a flat-film die, the resultant film is drawn off on one or more rolls for solidification, the film is then biaxially stretched, and the biaxially stretched film is heat-set and, if appropriate, corona-treated on the surface layer intended for the treatment.

The biaxial orientation process is generally carried out sequentially. In this process, orientation preferably first takes place longitudinally (i.e. in machine direction=MD) and then takes place transversely (i.e. perpendicularly to machine direction=TD). This leads to orientation of the molecular chains. The longitudinal orientation can be carried out with the aid of a plurality of rolls running at different speeds corresponding to the desired stretching ratio. An appropriate tenter frame is usually used for the transverse orientation process.

First, as is conventional in the coextrusion process, the polymer or the polymer mixtures for the individual layers is/are compressed and plastified in an extruder, and any additives used can be present in the polymer or the polymer mixture by this stage. The melts are then simultaneously compressed through a flat-film die (slot die), and the extruded multilayer melt is drawn off on one or more take-off rolls, whereupon the melt cools and solidifies to give a prefilm.

The temperature at which the stretching is carried out can vary within a relatively wide range, and depends on the desired properties of the film. The longitudinal stretching is generally carried out at a temperature in the range from 80 to 130° C., and the transverse stretching at a temperature in the range from 90 to 150° C. The longitudinal stretching ratio is generally in the range from 2.5:1 to 6:1, preferably from 3.0:1 to 5.5:1. The transverse stretching ratio is generally in the range from 3.0:1 to 5.0:1, preferably from 3.5:1 to 4.5:1.

Prior to the transverse stretching process, the surface of the amorphous outer layer (A) of the film is advantageously in-line coated with the acrylic coating emulsion described above by the known processes, e.g. by Meyer-bar coating or reverse-gravure-roll coating.

In the heat-setting process which follows, the film is kept for a period of from about 0.1 to 10 s at a temperature of from about 150 to 250° C. The film is then wound up conventionally.

After the biaxial stretching process, the uncoated surface of the film is preferably corona- or flame-treated by one of the known methods. The intensity of treatment is generally in the range above 50 mN/m.

Properties

The table below (Table 1) again summarizes the most important inventive properties of the film.

TABLE 1

| Property | Preferred | Particularly preferred | Very particularly preferred | Unit | Test method/ Comment |
|---|---|---|---|---|---|
| Coating thickness | 0.01-0.1 | 0.015-0.09 | 0.02-0.08 | μm | |
| Crystallinity of amorphous outer layer (A) | >2.2 | >2.3 | >2.4 | | Ratio of ATR bands at 1040 and 1337 cm$^{-1}$ |
| Crystallinity of crystalline outer layer (C) | <1.2 | <1.1 | <1.0 | | Ratio of ATR bands at 1040 and 1337 cm$^{-1}$ |
| Adhesion | <1.0 | <0.7 | <0.4 | N/15 mm | 180° C., 0.5 s, 4 bar |
| Outer layer (A) gloss | >100 | >125 | >150 | | DIN 67530, measurement angle 20° |
| Haze | <8 | <6 | <4 | % | ASTM D1003-61 method A |

Examples are used below for further illustration of the invention. The following test methods were used for determination of properties:

Measurement of Crystallinity

The crystallinity of the respective side of the film is determined from the ratio of the intensities of the bands at 1040 cm$^{-1}$ and 1337 cm$^{-1}$ in the ATR spectrum (ATR=attenuated total reflection), the intensities having been standardized on the basis of the bands at 1117 cm$^{-1}$. The band at 1040 cm$^{-1}$ is attributable to amorphous polyester, and that at 1337 cm$^{-1}$ is attributable to crystalline polyester (Polymer Letters Edition, Vol. 12 (1974), pp. 13-19).

For amorphous layers:

$$\frac{I_{1040 cm^{-1}}}{I_{1337 cm^{-1}}} > 2.2$$

For crystalline layers:

$$\frac{I_{1040 cm^{-1}}}{I_{1337 cm^{-1}}} < 1.2$$

A Bruker (Karlsruhe, DE) IFS28 IR spectrometer is used for the test, using a diamond ATR crystal.

The ATR spectrum can be recorded directly on the coated film as long as the thickness of the coating does not exceed 0.1 μm; it is assumed that the coating of thickness up to 0.1 μm has not effect on the spectrum of the outer layer. If there are doubts in this respect, the coating can be removed prior to recording of the ATR spectrum.

Measurement of Median Particle Diameter $d_{50}$

The median particle diameter $d_{50}$ is determined by means of a laser in a Mastersizer (Malvern Instruments, UK), using the standard method (examples of other test equipment being the Horiba LA 500 (Horiba Ltd., JP) or Helos (Sympatec GmbH, DE), which used the same measurement principle). For this, the specimens are placed in a cell with water and these are then placed in the measurement device. The test procedure is automatic and also includes the mathematical determination of the $d_{50}$ value. The $d_{50}$ value is defined here as a value determined from the (relative) cumulative particle size distribution curve: the point where the 50% by weight ordinate value intersects the cumulative curve gives the desired $d_{50}$ on the abscissa axis.

Haze

Haze is determined to ASTM D1003-61, method A.

Adhesion with Respect to Itself and to Metal

To determine the adhesion of the film with respect to itself, the amorphous side of two strips of film of width 15 mm is mutually superposed and these are pressed together at 180° C. for a period of 0.5 s using a pressure of 9 bar (equipment: Brugger NDS, single-side heated sealing jaw). Adhesion is determined by the 180° peel method. To determine the adhesion of the film with respect to metal, the amorphous side of a strip of film of width 15 mm is placed on a strip of the same size comprised of ECC steel, and the test described above is carried out.

Gloss

Gloss is determined to DIN 67530 (angle of incidence: 20°).

SV Value (Standard Viscosity)

Standard viscosity SV (DCA) is determined by a method based on DIN 53726 in dichloroacetic acid at 25° C. Intrinsic viscosity (IV) of polyethylene terephthalate is calculated as follows from the standard viscosity $$IV=[\eta]=6.907*10^{-4} \, SV(DCA)+0.063096 \, [dl/g]$$

Processing Performance of Film

Film performance was assessed visually during processing.

++: No adhesion to embossing rolls

−: Adhesion to embossing rolls

Example 1

The following starting materials were used to produce the film described below:

| Outer layer (A): | |
|---|---|
| 100% by weight | of copolyester comprised of 82 mol % of ethylene terephthalate and 18 mol % of ethylene isophthalate with SV value of 800 |
| Base layer (B): | |
| 100% by weight | of polyethylene terephthalate with SV value of 800 |
| Outer layer (C), a mixture comprised of: | |
| 80% by weight | of polyethylene terephthalate with SV value of 800 |
| 20% by weight | of masterbatch comprised of 99% by weight of polyethylene terephthalate (SV value of 800) and 1% by weight of Sylobloc 44 H (synthetic $SiO_2$ from Grace, $d_{50}$: 2.5 µm) |

The abovementioned raw materials were melted in one extruder per layer and extruded through a three-layer slot die onto a cooled take-off roll. The resultant amorphous prefilm was then first oriented longitudinally. The longitudinally stretched film was corona-treated in a corona-discharge device and then coated with the following composition on the outer layer (A) via reverse-gravure coating:

5% by weight acrylate copolymer, comprised of 60% by weight of methyl methacrylate, 35% by weight of ethyl acrylate, and 5% by weight of N-methylolacrylamide, in water.

After the coating process, the film was stretched transversely, fixed, and wound up (final thickness of film 12 µm, each of the outer layers 1 µm). The conditions in the individual steps of the process were:

| Longitudinal stretching: | Temperature: | 80-120° C. |
|---|---|---|
| | Longitudinal stretching ratio: | 4.0 |
| Transverse stretching: | Temperature: | 80-135° C. |
| | Transverse stretching ratio: | 4.2 |
| Setting: | | 2 s at 235° C. |

The thickness of the dried coating was about 0.025 µm.

The properties of the resultant film are given in Tables 2 and 3.

Example 2

Example 1 was now modified by producing a film of thickness 50 µm. The outer-layer thickness of the amorphous layer (A) was 5 µm and the thickness of the crystalline layer (C) was 3 µm. The thickness of the dry coating was about 0.03 µm.

Example 3

Example 1 was now modified by changing the polyester of the amorphous outer layer (A):

Outer layer (A):
100% by weight of copolyester comprised of 85 mol % of ethylene terephthalate and 15 mol % of ethylene isophthalate with SV value of 800

Adhesion at high temperatures was less than in Example 1.

Comparative Example 1

Comparative Example 1 was produced in accordance with Example 4 of EP-A-1 291 155. For this, a method analogous to Example 1 was used to produce an AB film with the following layer structure:

| Outer layer (A): | |
|---|---|
| 100% by weight | of copolyester comprised of 82 mol % of ethylene terephthalate and 18 mol % of ethylene isophthalate with SV value of 800 |
| Base layer (B): | |
| 94% by weight | of polyethylene terephthalate with SV value of 800 |
| 6% by weight | of masterbatch comprised of 99% by weight of polyethylene terephthalate (SV value of 800) and 1.0% by weight of Sylobloc 44 H (synthetic $SiO_2$ from Grace, $d_{50}$: 2.5 µm) |

The longitudinally stretched film was corona-treated in a corona-discharge device and then coated with the following composition on the outer layer (A) via reverse-gravure coating:

49% by weight of Setalux 37-3372 (Akzo Nobel)

0.01% by weight of Surfinol 440 (Air Products)

1.2% by weight of propylene glycol phenyl ether

49% by weight of water

The final thickness of the film was 12 µm. The thickness of the outer layer (A) was 0.6 µm. The thickness of the dried coating was 0.4 µm.

Studies have shown that embossing deforms the coating, but not the outer layer.

Comparative Example 2

Comparative Example 1 was modified by reducing the thickness of the coating to 0.1 µm. The resultant film exhibited only unsatisfactory embossing performance. The hologram was unclear.

The most important properties of the resultant films are summarized in Table 2.

TABLE 2

| | IE1 | IE2 | IE3 | CE1 | CE2 |
|---|---|---|---|---|---|
| Film thickness (µm) | 12 | 50 | 12 | 12 | 12 |
| Thickness of outer layer (A) (µm) | 1 | 5 | 1 | 0.6 | 0.6 |
| Thickness of dry coating (µm) | 0.025 | 0.03 | 0.025 | 0.4 | 0.1 |
| Crystallinity of outer layer (A) | 3.4 | 3.5 | 3.2 | 3.4 | 3.4 |
| Crystallinity of outer layer (C) | 0.8 | 0.8 | 0.8 | 0.8 | 0.8 |

TABLE 2-continued

|  | IE1 | IE2 | IE3 | CE1 | CE2 |
|---|---|---|---|---|---|
| Adhesion of outer layer (A) with respect to itself (N/15 mm) | <0.5 | <0.5 | <0.5 | 2.1 | 1.7 |
| Haze (%) | 2.0 | 4.1 | 2.1 | 1.9 | 2.0 |
| Gloss of outer layer (A) | 160 | 153 | 159 | 165 | 162 |
| Processing performance | ++ | ++ | ++ | − | − |

That which is claimed:

1. A multilayer biaxially oriented, transparent, hot-embossable polyester film comprising a base layer (B), an amorphous outer layer (A) located on a surface of the base layer (B), with a coating on this outer layer (A), and a crystalline outer layer (C) located on the other surface of the base layer (B), wherein
   a) the crystallinity of the amorphous outer layer (A), expressed as the ratio of the signals at 1040 $cm^{-1}$ and 1337 $cm^{-1}$ in the ATR spectrum, is greater than 2.2,
   b) the thickness of the coating on the outer layer (A) is from 0.01 to 0.1 μm,
   c) the coating has been crosslinked, and
   d) the film does not adhere to itself or metal at a temperature of 180° C.

2. The film as claimed in claim 1, wherein the thickness of the amorphous outer layer (A) is from 0.5 to 5.0 μm.

3. The film as claimed in claim 1, wherein the amorphous outer layer (A) comprises less than 0.01% by weight of external particles, based on the total weight of the outer layer (A).

4. The film as claimed in claim 1, wherein the crystallinity of the crystalline outer layer (C), expressed as the ratio of the signals at 1040 $cm^{-1}$ and 1337 $cm^{-1}$ in the ATR spectrum, is smaller than 1.2.

5. The film as claimed in claim 1, wherein the outer layer (C) comprises particles at a concentration of from 0.05 to 0.5% by weight.

6. The film as claimed in claim 1, wherein the gloss (measured at 20° C.) of the outer layer (A) is greater than 100.

7. The film as claimed in claim 1, wherein said film exhibits a haze value of smaller than 8%.

8. The film as claimed in claim 1, wherein the coating on the outer layer (A) is an acrylate coating.

9. The film as claimed in claim 1, wherein the acrylate coating comprises at least 50% by weight of one or more polymerizable acrylic and/or methacrylic monomers and from 1 to 15% by weight of a crosslinkable-copolymerizable comonomer generating intermolecular crosslinking on exposure to an elevated temperature with or without addition of a crosslinking agent.

10. The film as claimed in claim 1, wherein the outer layer (C) comprises particles having a median diameter ($d_{50}$ value) in the range from 1.0 to 5.0 μm.

11. The film as claimed in claim 1, wherein said film exhibits an adhesion value both to itself and to metal of smaller than 1.0 N/15 mm.

12. A process for production of a film as claimed in claim 1 comprising
    coextruding the melts corresponding to the individual layers A, B, and C of the film through a flat-film die,
    drawing off the resultant film for solidification on one or more rolls,
    biaxially stretching the film in the machine direction and transversely,
    heat-setting the biaxially stretched film and winding up the heat-set film,
wherein said process further comprises
    using, for the outer layer (A), a polyester in which the ratio of the signals at 1040 $cm^{-1}$ and 1337 $cm^{-1}$ in the ATR spectrum is greater than 2.2, and
    coating the film, after the stretching in the machine direction and prior to the transverse stretching, with an acrylic coating emulsion.

13. Embossable film comprising film as claimed in claim 1.

14. Packaging film comprising film as claimed in claim 13.

15. Security film comprising film as claimed in claim 13.

* * * * *